Nov. 11, 1952 S. C. KUNZMANN ET AL 2,617,250
DOUBLE-LINK CHAIN MACHINE
Filed Sept. 24, 1949 8 Sheets-Sheet 1

INVENTORS.
SIEGFRIED C. KUNZMANN
and AUGUST J. ENGLAND
BY
Edwin Lensohn &
Harry Cohen
ATTORNEYS.

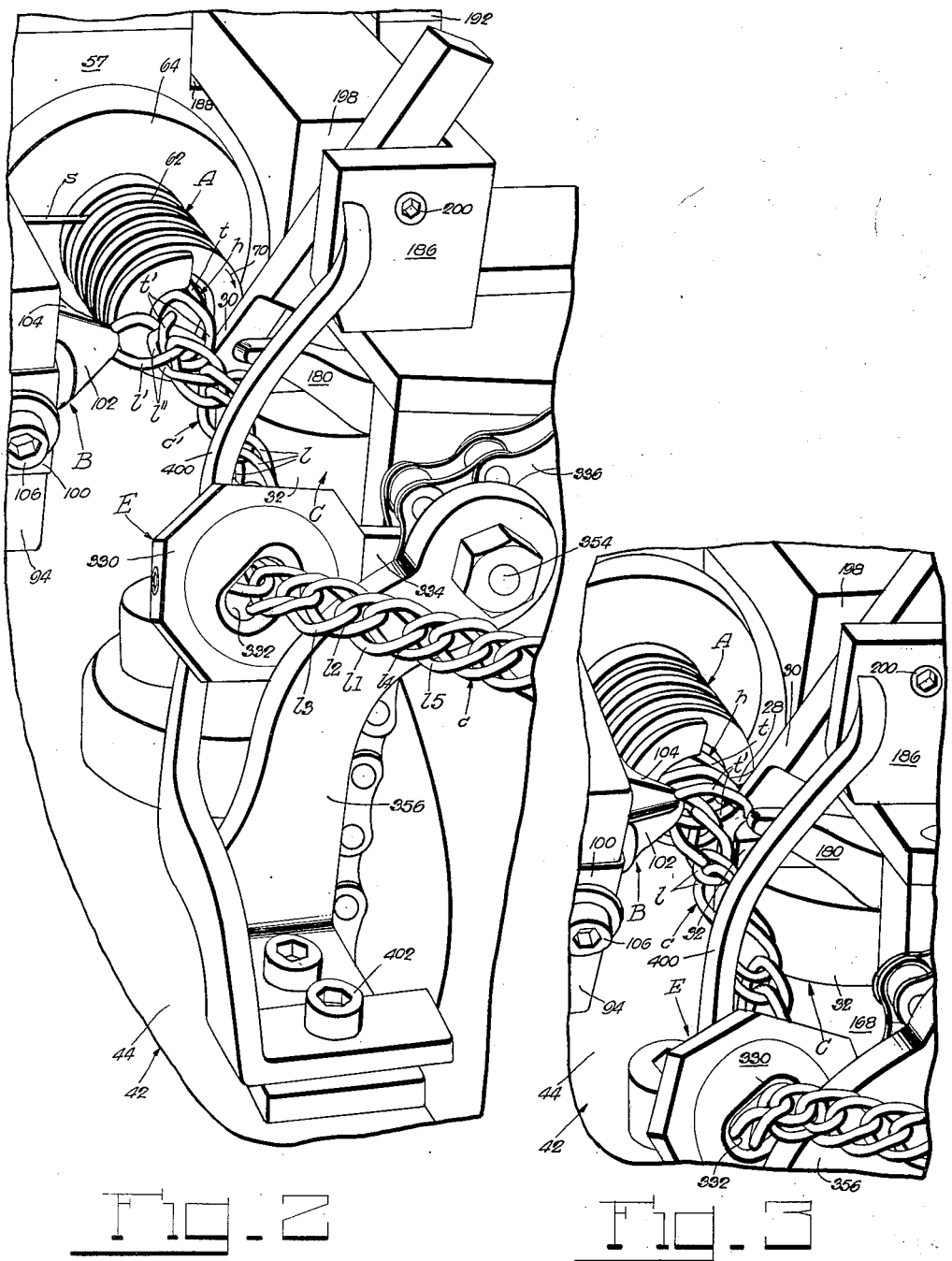

INVENTORS.
SIEGFRIED C. KUNZMANN
and AUGUST J. ENGLAND
BY Edwin Levisohn &
Harry Cohen
ATTORNEYS.

Nov. 11, 1952  S. C. KUNZMANN ET AL  2,617,250
DOUBLE-LINK CHAIN MACHINE
Filed Sept. 24, 1949  8 Sheets-Sheet 4
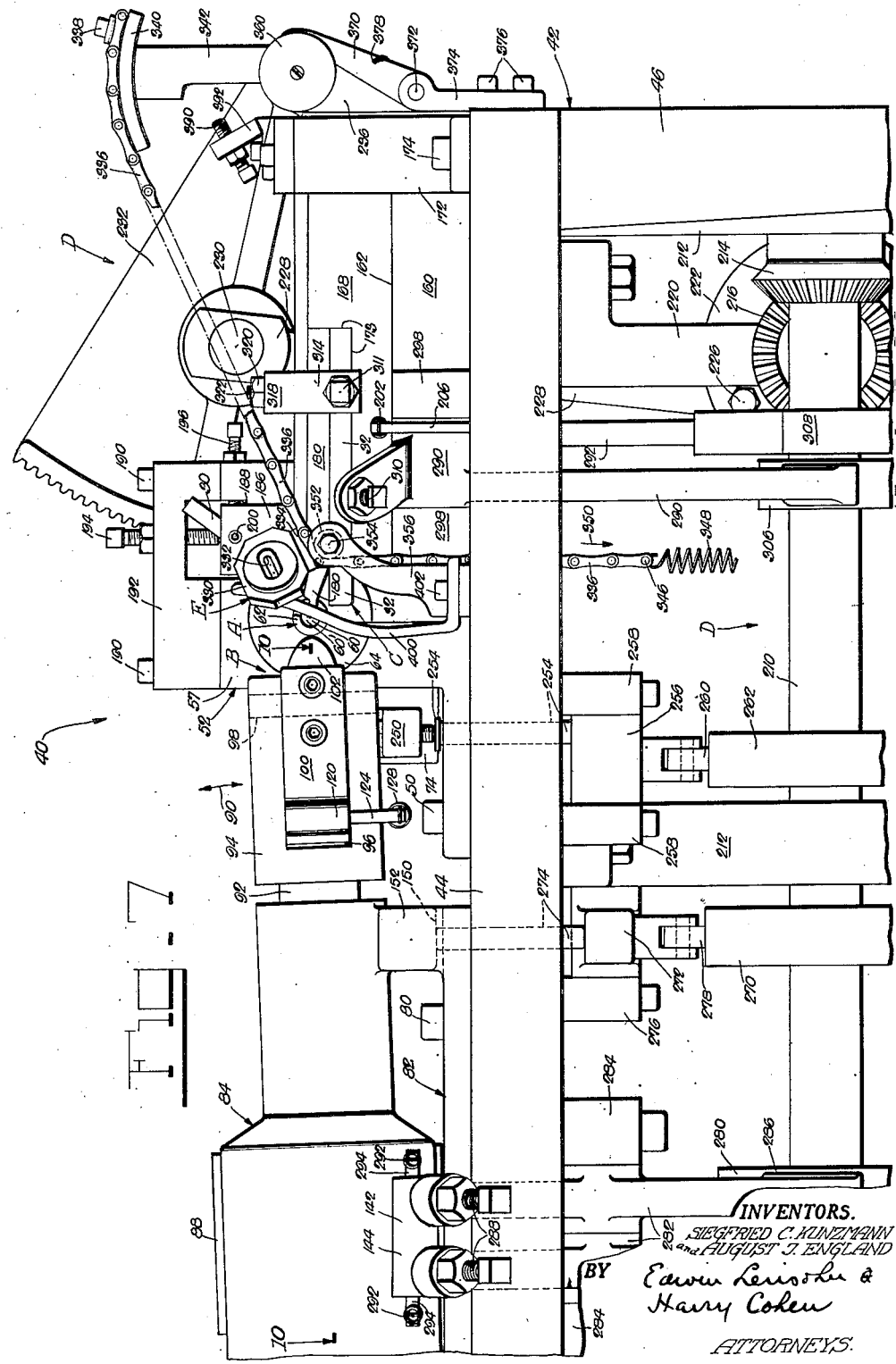
INVENTORS.
SIEGFRIED C. KUNZMANN
and AUGUST J. ENGLAND
BY Edwin Levisohn &
Harry Cohen
ATTORNEYS.

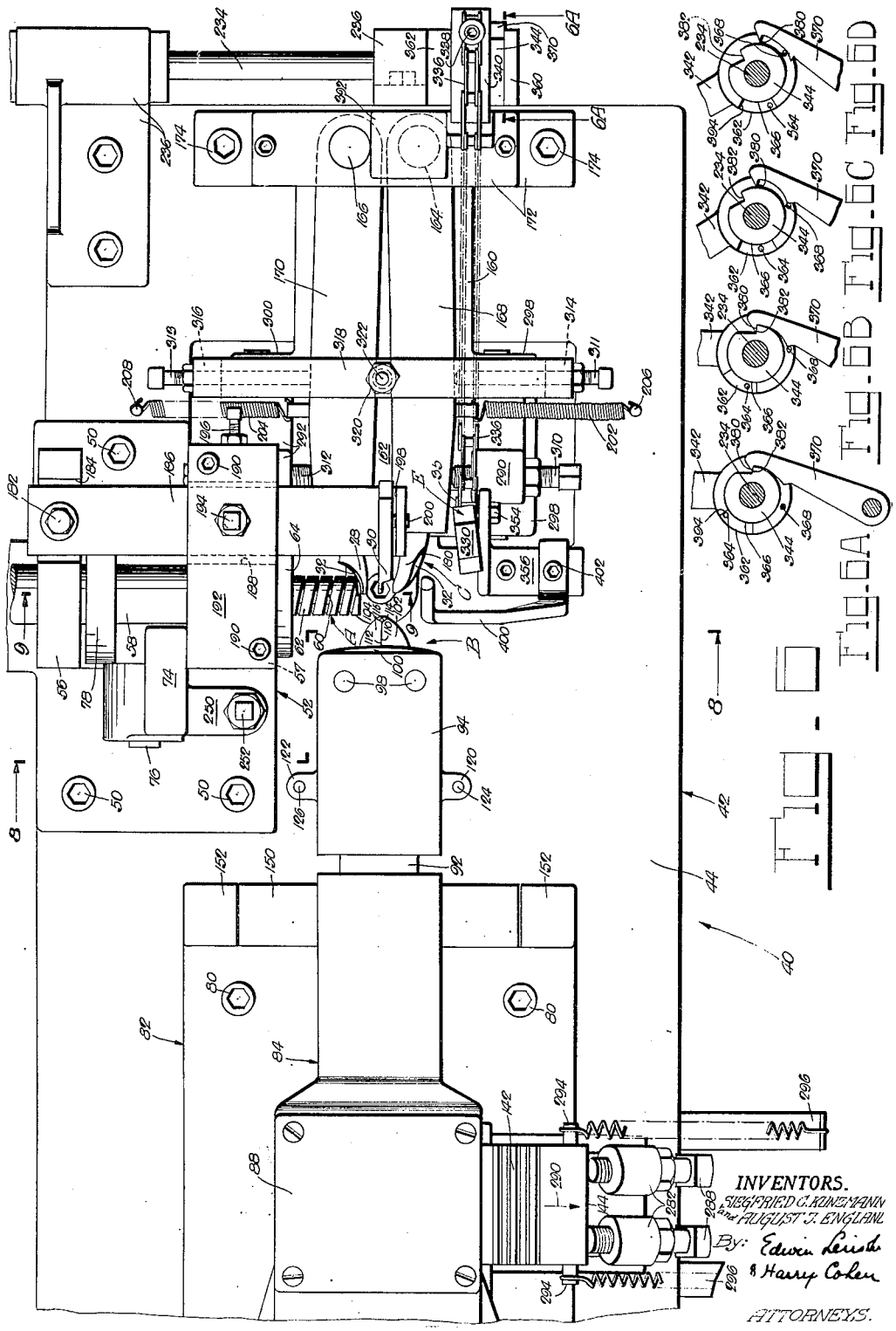

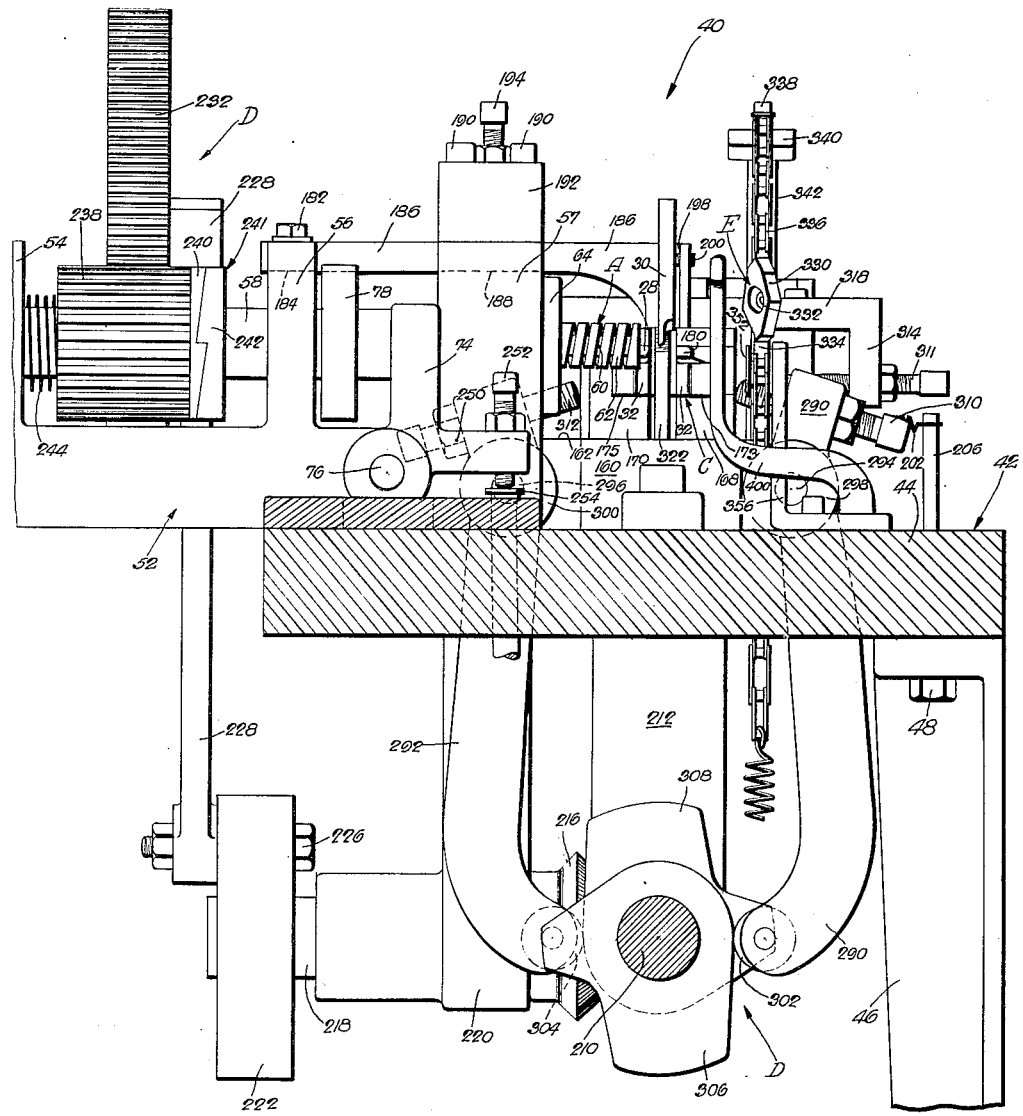
Nov. 11, 1952     S. C. KUNZMANN ET AL     2,617,250
DOUBLE-LINK CHAIN MACHINE
Filed Sept. 24, 1949     8 Sheets-Sheet 6
INVENTORS.
SIEGFRIED C. KUNZMANN
and AUGUST J. ENGLAND
BY Edwin Levisohn &
Harry Cohen
ATTORNEYS.

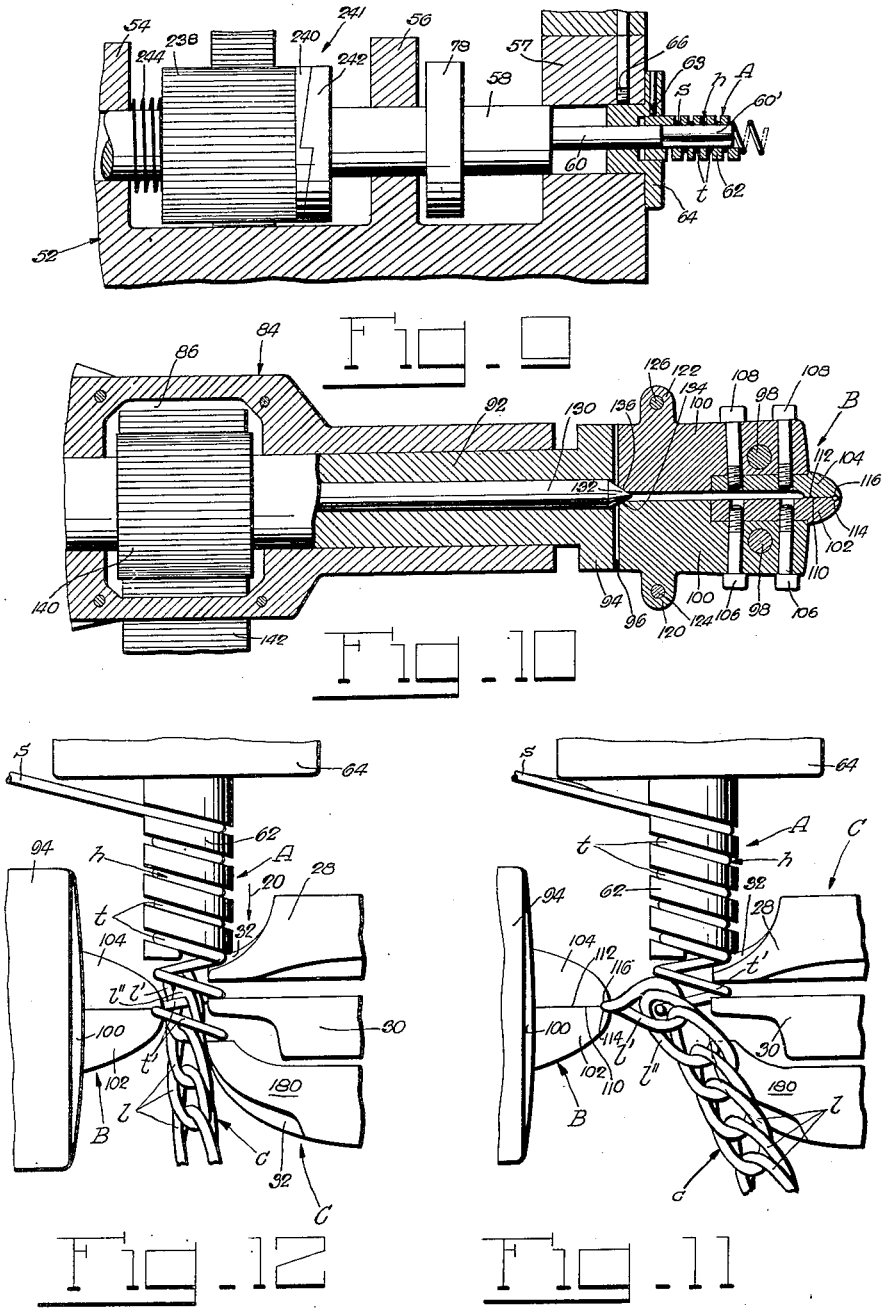

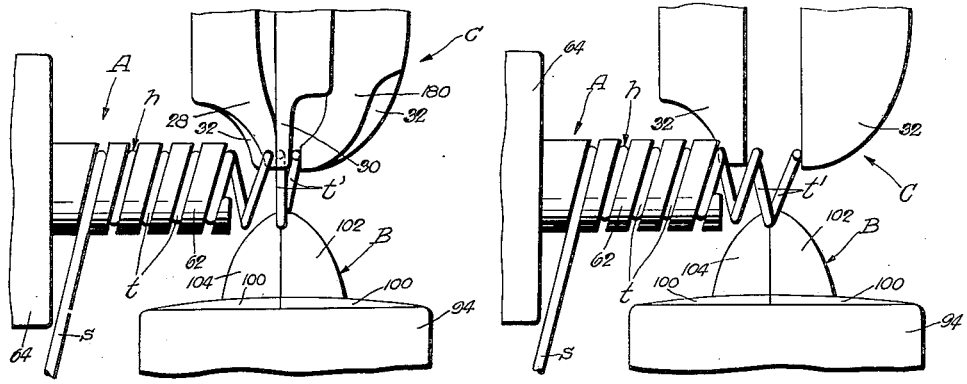
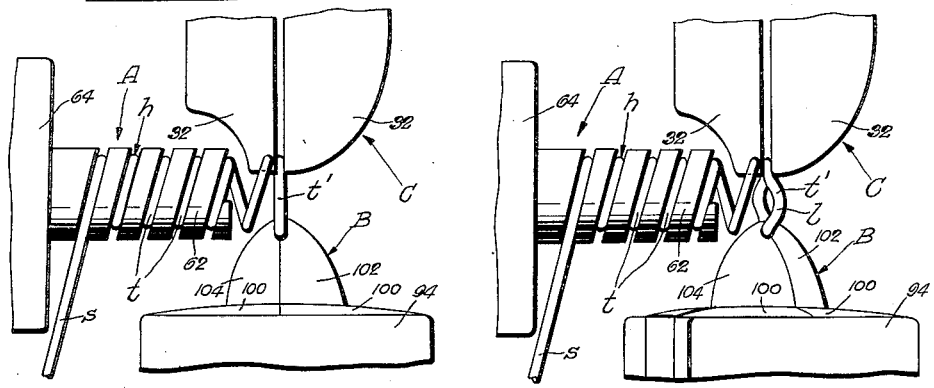
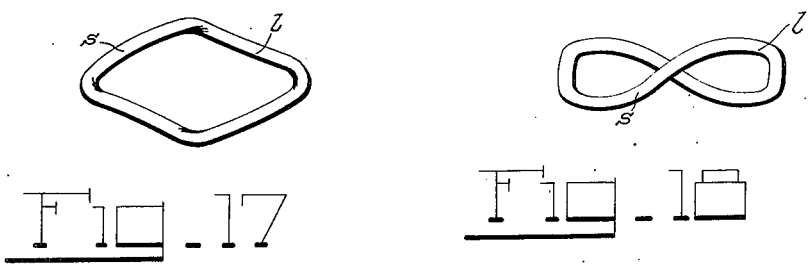

Patented Nov. 11, 1952

2,617,250

UNITED STATES PATENT OFFICE 2,617,250

DOUBLE-LINK CHAIN MACHINE

Siegfried C. Kunzmann, Smithfield, and August J. England, Providence, R. I., assignors to Kunzmann Chain Co., Providence, R. I., a corporation Application September 24, 1949, Serial No. 117,642

19 Claims. (Cl. 59—17)

1

This invention relates to chain-making machines, and more especially to machines for making chains of the multi-link type.

Conventional chain-making machines of the type used in the manufacture of these chains form from a continuous supply wire successive links which during their formation into link form are concatenated with previously formed and concatenated links of the chain being made. To this end, these machines form the supply wire on an intermittently turned arbor into generally helical form from which the leading turns are successively severed, after being first directed during the intermittent turns of the arbor into the last-formed links of the chain being made and then held by gripping jaws for their subsequent closure into final link form. While thus held by the jaws after its closure, each last link of the chain is in position for the reception of the next lead of the wire helix. For making chains of the multi-link type in which each link passes through two or more adjacent links, different provisions have previously been made on these machines to compel each successive lead of the wire helix to pass through two or more of the last-formed links of the chain being made. However, these previous provisions are either unreliable in the performance of their designated function, particularly at high efficient operating speeds of the machines, or are costly and complicated in their construction, or both.

It is the primary object of the present invention to make in chain-making machines of this type structurally simple and inexpensive provisions by means of which to hold the last-formed links of a chain being made in position for the unfailing reception of the successive leads of the wire helix even at very high operating speeds of the machines.

It is another object of the present invention to incorporate these provisions in a device which lends itself to simple installation in existing chain machines of this type without requiring appreciable, if any, structural changes in the latter.

The above and other objects, features and advantages of the present invention will be more fully understood from the following description considered in connection with the accompanying illustrative drawings.

In the drawings:

Fig. 1 is a fragmentary perspective view of a chain machine embodying the present invention;

2

Figs. 2 to 5, inclusive, are fragmentary perspective views similar to Fig. 1, showing the machine in different stages during an operating cycle thereof;

Fig. 6 is a fragmentary top plan view of the machine;

Fig. 6A is a section taken on the line 6A—6A of Fig. 6;

Figs. 6B, 6C and 6D are sections similar to Fig. 6A, showing the elements of Fig. 6A in different operating positions, respectively;

Fig. 7 is a fragmentary side elevation of the machine;

Fig. 8 is a section taken substantially on the line 8—8 of Fig. 6;

Fig. 9 is a fragmentary section taken substantially on the line 9—9 of Fig. 6;

Fig. 10 is a fragmentary section taken substantially on the line 10—10 of Fig. 7;

Figs. 11 to 16, inclusive, are enlarged fragmentary plan views of certain cooperating elements of the machine in different operating positions, respectively; and, Figs. 17 and 18 are enlarged side and edge views, respectively, of a link of a chain made in the present machine.

Figure 1:
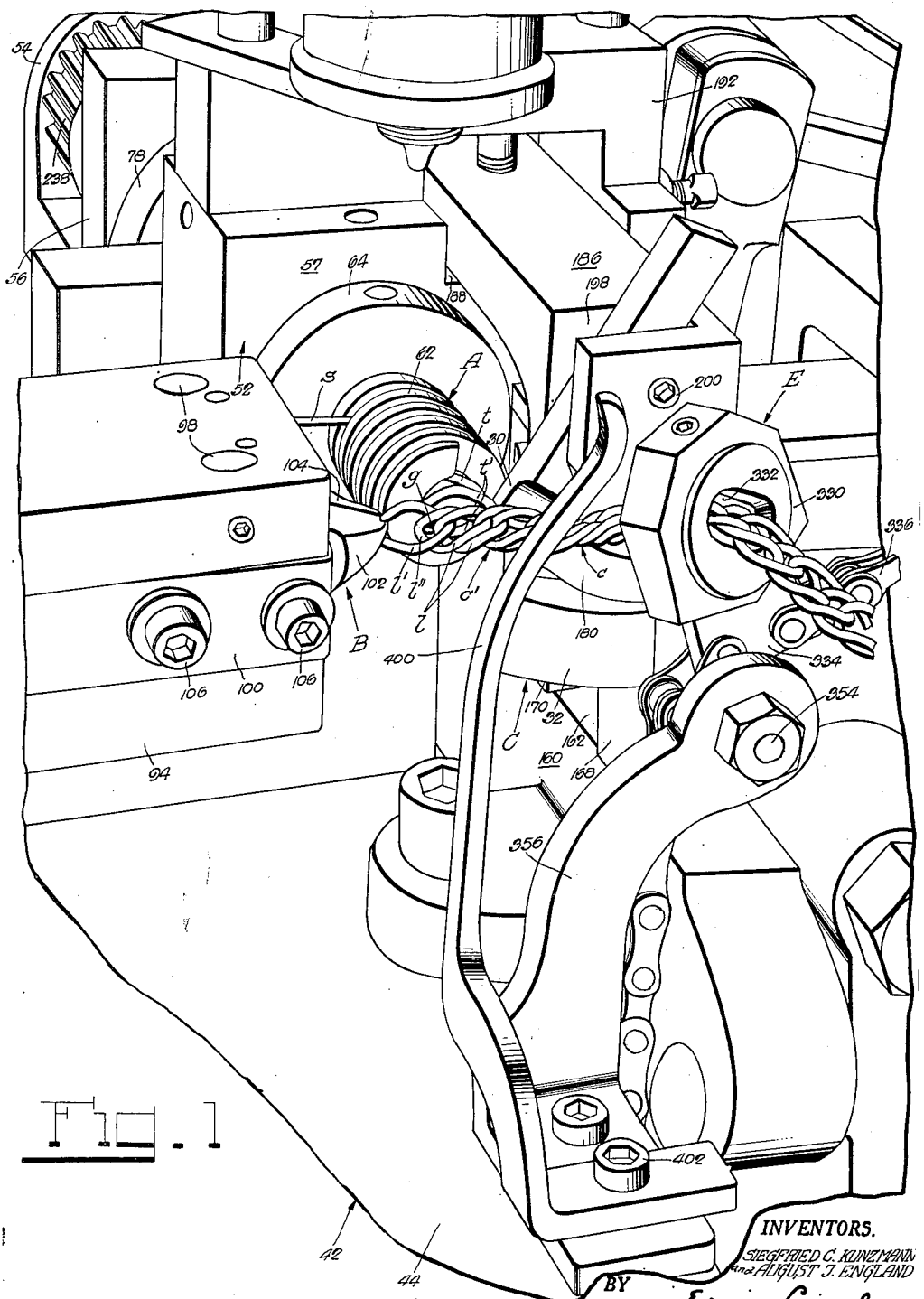

The present invention is concerned with a machine for making chains $c$ of the type best indicated in Fig. 2, which is composed of a multitude of links $l$ each of which is concatenated with more than two adjacent links. In the present instance, the chain $c$ is of the double-link type in which each link, except the endmost, is concatenated with four adjacent links. This appears clearly from Fig. 2, in which the link $l^1$, for instance, of the chain is shown concatenated with the adjacent link pairs $l^2$, $l^3$ and $l^4$, $l^5$. Each link $l$ of the chain $c$ is formed from precious or non-precious wire stock $s$. More particularly, the wire stock $s$ is in the present machine formed into a helix $h$ (Figs. 4 and 11) of which the turns $t$ are of the cross-sectional shape of the links $l$ of the chain into which they are to be formed. The wire stock $s$ is formed into the helix $h$ on a wire former A (Fig. 12) that includes an arbor on which the wire is wound and which is during each link-forming cycle of the machine turned through one complete revolution in order to advance the wire helix $h$ in the direction of the arrow 20 in Fig. 12 through a distance equivalent to one complete turn $t$ thereof, so that the leading turn $t'$ will assume the position shown in Fig. 12 at the end of each intermittent turn of the arbor. Assuming that a length of chain $c$ has already been formed in the machine and that a link-forming cycle of the latter has just been started, as shown in Figs. 1 and 11, the last-formed link $l'$ of the chain will then be held by a link gripper B in a position in which it is in the path of, and will be entered by, the end of the leading turn $t'$ of the wire helix during its screw-like advance into the foremost position shown in Fig. 12. Inasmuch as each newly-formed link $l$ is to pass through the two adjacent end links of the chain being formed, provisions are made to coordinate the second last link $l''$ of the chain with the last link $l'$ so that the leading turn $t'$ of the wire helix will, during its advance into the described foremost position, pass without fail through both last links of the chain. After the passage of the leading turn $t'$ of the wire helix through the end links $l'$ and $l''$ of the chain $c$, the gripper B releases the end link $l'$, then advances from the position shown in Fig. 11 to that shown in Fig. 12 and grips the adjacent leading turn $t'$ of the wire helix, the chain $c$ then securely hanging with its end link $l''$ on the leading turn $t'$ of the helix. The gripped turn $t'$ of the wire helix is next severed from the remaining turns $t$ thereof by cooperating shear members 28 and 30 of a link-forming device C (Fig. 13). The leading turn $t'$ thus severed from the wire helix is next lowered by the gripper B from the position shown in Fig. 3 into that shown in Figs. 4 and 14 in which the severed turn $t'$ is in operative relation with link-closing jaws 32 of the link-forming device C. As shown in Fig. 15, the jaws 32 will, on their closure, close the severed turn $t''$ of the wire helix by forcing the spaced ends thereof into engagement with each other. Finally, the closed turn $t'$, which at this stage of its formation is a nearly finished link, is twisted by a rotary motion of the gripper B (Figs. 5 and 16) while the link is still clamped with its opposite side between the jaws 32. In thus twisting the nearly finished link, the same is curved as shown in Figs. 16 and 18. The link being finished, the jaws 32 will open and release the same and the gripper B will turn back to its original position (Fig. 11) in order to present the link just completed and the link next thereto of the chain $c$ to the next leading helix $t$ for penetration by the latter on the next intermittent revolution of the arbor. In this fashion, link after link is formed and concatenated with the successive end links of the chain being formed.

Referring now to Figs. 6 to 8, inclusive, the reference numeral 40 designates a chain machine which comprises, in the present instance, a machine table 42 having a top 44 and supporting legs 46 which may be separate from the top and conveniently secured thereto by bolts 48. Mounted on the table 42 are the various operating devices of the machine. These devices are the wire former A (Figs. 1 to 9, inclusive); the gripper B (Figs. 1 to 7, inclusive, and 10); the link-forming device C (Figs. 1 to 8, inclusive); operating and control devices D (Figs. 7 and 8); and chain-handling provisions E (Figs. 1 to 8, inclusive). These operating devices of the machine will now be described.

Wire former A

Referring more particularly to Figs. 6 and 8, there is mounted at 50 on the machine table 42 a bracket 52 having spaced bearing lugs 54, 56 and 57 in which a shaft 58 is rotatably and axially slidably supported. As shown in Fig. 9, the shaft 58 has a cross-sectionally reduced forward projection 60 which serves as an arbor on which the wire helix $h$ is to be wound. Accordingly, a leading length 60' of the arbor 60 is made of the same cross-sectional contour as that of the links $l$ of which the chain $c$ is composed (Fig. 17). Surrounding the arbor 60 is a helical guide member 62 which projects from, and may suitably be mounted at 63 in, a bushing 64 which is, in turn, suitably mounted in the bearing lug 57 of the bracket 52, as by a set screw 66 (Fig. 9). The wire stock $s$ is in any suitable manner directed into the gap between the turns of the helical guide member 62 in the manner shown in Figs. 1 to 5 and 11, and is formed into the wire helix $h$ on the arbor 60 during intermittent revolutions of the latter in winding direction. After the leading end of a fresh supply of wire $s$ has in any suitable manner been wound around the arbor 60 for its anchorage thereon, the latter will, during each intermittent revolution thereof in winding direction as indicated by the arrow 70 in Fig. 2, draw wire from the supply. Provided between the wire supply and the wire former A may be any suitable wire brake (not shown) which will maintain the wire sufficiently taut to assure its snug winding on the form-giving arbor 60 during each intermittent revolution of the latter. Thus, the arbor 60 imparts to the wire helix $h$ thereon its cross-sectional shape, i. e., that of the links $l$ of the chain $c$, while the guide member 62 leads the wire about the arbor 60 in a direction to give it the requisite pitch for the further formation of its turns $t$ into individual links $l$.

The wire helix $h$ is thus formed turn after turn during intermittent revolutions of the arbor 60. The arbor 60 and its shaft 58 being free to move axially, the former will advance with the helix during the formation of each turn of the latter, provisions to be described being made to retract the arbor 60 after each advance thereof. In thus permitting the arbor 60 to advance with the wire helix during the formation of each new turn of the latter, friction between the wire and the arbor is eliminated and friction between the wire and the guide member 62 is reduced to a minimum, with the result that one complete turn $t$ is assuredly added to the wire helix $h$ on each complete revolution of the arbor 60. As already mentioned, the arbor 60, is after the formation of each new turn of the wire helix $h$, retracted by means of a rocker 74 (Figs. 6 and 8) which is pivotally mounted at 76 on the bracket 52 and adapted to engage a collar 78 on the arbor shaft 58.

Gripper B

Referring now particularly to Figs. 6 and 7, there is suitably mounted as at 80 on the machine table 42 a bracket 82 on which is pivotally supported a casing 84 having a cavity 86 (Fig. 10) which is normally closed by a removable cover plate 88. The pivot support (not shown) of the casing 84 on the bracket 82 is to the left of the cover plate 88 as viewed in Fig. 6, and the pivot axis is such as to permit swinging movement of the casing 84 in the direction of the arrow 90 in Fig. 7. Suitably journaled in the casing 84 is the hollow shank 92 of a gripper head 94, having a recess 96 in which are pivoted at 98 holders 100 for cooperating jaws 102 and 104, respectively (Fig. 10). The jaws 102 and 104, which are adjustably mounted in their respective holders 100 by screws 106 and 108, respectively, are provided in their respective faces 110 and 112 with aligned recesses 114 and 116, respectively, in which to clamp the last link $l'$ of the chain $c$ being made (Fig. 11), or the leading turn $t'$ of the wire helix $h$ (Fig. 12). The holders 100 are provided with oppositely projecting lugs 120 and 122, respectively, from which depend studs 124 and 126, respectively, on which are anchored the ends of a tension spring 128 (Fig. 7) that normally rocks the holders 100 in a direction to cause opening of the jaws 102 and 104. For closing the jaws 102 and 104 against the tendency of the spring 128 to open them, there may be provided in the hollow shank 92 of the gripper head 94 an axially slidable bar 130 (Fig. 10) having a conical end 132 which cooperates with beveled surfaces 134 and 136 of the holders 100, respectively.

As previously explained, the gripper B is for the finish-formation of each link $l$ twisted (Fig. 16) in order to lend to the link its curbed shape. To accomplish this twist, the gripper head 94 is with its hollow shank 92 turned in the casing 84. To impart turning movement to the shank 92 of the gripper head 94, the same is provided within the confines of the cavity 86 in the casing 84 with a gear 140 which is in permanent mesh with a rack 142 (Figs. 6, 7 and 10). The rack 142 is mounted in any suitable manner for reciprocatory movement in the casings 84, and projects to the outside of the latter for its actuation by means described hereinafter.

As previously mentioned, the gripper B is, by virtue of the pivotal mounting of the casing 84, also swingable in the direction of the arrow 90 in Fig. 7. The casing 84 is for such swinging movement of the gripper B guided with its cross bar 150 between opposite lugs 152 of the bracket 82 (Fig. 6).

*Link-forming device C*

Referring now to Figs. 6, 7 and 8, the reference numeral 160 designates a plate support having a machined top surface 162 on which tool holders 168 and 170 are swingable about their respective pivots 164 and 166. The pivots 164 and 166 are mounted in the plate support 160, and the tool holders 168 and 170 are retained on the plate support 160 by a bracket 172 which is mounted at 174 on the machine table 42. The tool holders 168 and 170 are longitudinally recessed at 173 and 175, respectively, for suitable, preferably adjustable, mounting therein of the previously mentioned jaws 32, respectively. Also mounted in the recesses 173 and 175 of the tool holders 168 and 170, respectively, in superposed relation with the jaws 32 therein are a stop member 180 and the previously mentioned shear member 28, respectively. The stop member 180 is designed to prevent any unauthorized advance of the leading turn $t'$ of the wire helix $h$ beyond the foremost position shown in Fig. 12.

Bolted at 182 in a recess 184 in the bearing lug 56 of the bracket 52 is another tool holder 186 (Figs. 6, 7 and 8) which extends through a groove 188 in the bearing lug 57 of the bracket 52 and is therein clamped in angularly adjusted position about the bolt 182 as an axis. To this end, there is suitably mounted at 190 on the bearing lug 57 of the bracket 52 a member 192 in which is threadedly received a screw 194 with which to clamp the tool holder 186 in its adjusted position in the groove 188 in the bearing lug 57. Threadedly received in the bearing lug 57 of the bracket 52 is a set screw 196 with which to adjust the tool holder 186 after first loosening the clamping screw 194 and the bolt 182, as will be readily understood. The tool holder 186 is provided near one end thereof with a groove 198 in which the previously mentioned shear member 30 is adjustably mounted by means of one or more clamping screws 200. The shear members 28 and 30, jaws 32 and stop member 180 are so coordinated with each other and with the wire former A and gripper B (Figs. 6, 7 and 8) that they perform their previously described functions during each link-forming cycle of the machine. The pivoted tool holders 168 and 170 are normally spread apart by springs 202 and 204, respectively, which are anchored with one end to the respective tool holders and with their other ends on posts 206 and 208, respectively, on the machine table 42.

*Operating and control devices D*

Referring now to Figs. 7 and 8, there is shown a power driven main shaft 210 which is journaled in suitable bearing brackets 212 on the bottom side of the machine table 42. Mounted on the shaft 210 is a bevel gear 214 which is in permanent mesh with another bevel gear 216 on a shaft 218 which is suitably journaled in another bearing bracket 220 on the machine table 42. The shaft 218 also carries a crank disk 222 having a radially adjustable pivot connection 226 with one end of a link or connecting rod 228 the other end of which is pivotally connected at 230 with a gear segment 232 on a shaft 234 journaled in suitable bearing brackets 236 on the machine table 42 (Fig. 6). The gear segment 232 is in permanent mesh with a gear 238 (Figs. 8 and 9) which is axially slidable on the arbor shaft 58. Secured to or integral with the gear 238 is a member 240 of a clutch 241 the companion member 242 of which is carried by the arbor shaft 58. Gear 238 is with its clutch member 240 normally yieldingly urged into driving engagement with the other clutch member 242 by means of a compression spring 244 which surrounds the arbor shaft 58 and is interposed between the gear 238 and the adjacent bearing lug 54 of the bracket 52. Thus, on rotation of the gear segment 232 in counterclockwise direction as viewed in Fig. 7, the gear 238 will, through intermediation of the clutch 241, drive the arbor shaft 58 in wire-winding direction. On return rotation of the gear segment 232 in clockwise direction as viewed in Fig. 7 into the position there shown, the clutch member 240 on the gear 238 will be cammed out of driving engagement with the other clutch member 242 by the latter, the spring 244 permitting the requisite separation of the clutch members 240 and 242. The stroke of the crank disk 220 is so adjusted that the gear segment 232 will, during each counterclockwise rotation thereof as viewed in Fig. 7, turn the arbor 60 through one complete revolution in wire-winding direction. The arbor shaft 58 and clutch member 242 are, by virtue of the wound wire helix $h$ on the arbor 60, prevented from backing up with the gear 238 and gear segment 232 on each return rotation of the latter into the position shown in Fig. 7. However, suitable ratchet means (not shown) may be provided, if desired, in order positively to prevent the arbor shaft 58 from backing up. Due to the relatively tight engagement of the wire helix $h$ with the arbor 60 and the pitch formation of the wire helix in the stationary member 62 (Fig. 9), the arbor 60 and its shaft 58 will be dragged along by the wire helix $h$ during each advance of the latter in the direction of the arrow 20 in Fig. 12. The clutch member 240 will, during each advance of the arbor 60 as just described, be biased into driving engagement with the companion member 242 on the arbor shaft 58 by the spring 244, so that the arbor will, despite its advance, be driven through one complete revolution during each link-forming cycle of the machine. To this end, the gear 238 is made of such width as to remain in all axial positions thereof in permanent engagement with the gear segment 232.

The advanced arbor 60 is, after the formation of each new turn $t$ of the wire helix $h$, withdrawn by means of the previously described rocker 74 into the retracted position shown in Fig. 9. To this end, the rocker 74 is provided with a laterally projecting arm 250 (Fig. 8) having an adjustment screw 252 which bears against a push rod 254 that rests on an arm 256 (Fig. 7) which is pivotally mounted in spaced bearing lugs 258 on the machine table 42. The arm 256 is provided with a follower 260 which cooperates with a cam disk 262 on the main shaft 210. The cam disk 262 is so designed as to cause quick retraction of the arbor shaft 58 and parts carried thereby and connected therewith immediately after the formation of each new turn $t$ of the wire helix $h$. The rocker 74 will by its own gravity return to the position shown in Fig. 8 immediately after each retraction of the arbor shaft 58, the latter remaining in its retracted position until the next revolution is imparted thereto by the gear segment 232, despite the spring 244 which is too weak to advance the arbor shaft 58 of its own accord.

The gripper B is swung about its pivot axis in the direction of the arrow 90 in Fig. 7 by and under the control of a cam disk 270 on the main shaft 210 through intermediation of an arm 272 and a push rod 274. The arm 272, which is pivotally mounted in bearing lugs 276 on the machine table 42, is provided with a follower 278 which cooperates with the cam disk 270. The push rod 274 rests with its lower end on the arm 272 remotely from its pivot support, and engages with its upper end the cross-bar 150 on the casing 84 (Fig. 7). Thus, the cam disk 270 raises the gripper B into the position shown in Figs. 1 to 3 and 7, and controls its gravity descent into the position shown in Figs. 4 and 5.

The rack 144 for turning the head 94 of the gripper B is in each link-forming cycle of the machine reciprocated by and under the control of a cam disk 280 on the main shaft 210 through intermediation of a rocker or rockers 282 (Fig. 7). The rockers 282, which are pivotally mounted in depending bearing lugs 284 on the machine table 42, are provided at one end with followers 286 for cooperation with the cam disk 280, and at the other end with adjustment screws 288 which engage the adjacent end face 144 of the rack 142. Tension springs 292 normally urge the rack 142 in the direction of the arrow 290 in Fig. 6 in which to return the head 94 of the gripper B into the non-twist angular position shown in Figs. 1 to 4. The springs 292 are anchored at 294 on the rack 142 and on brackets 296, respectively, which are suitably mounted on the machine table 42 (Fig. 6). Thus, the springs 292 will, through intermediation of the rack 142, also retain the follower arms 282 in permanent engagement with the cam disk 280, as will be readily understood. The end face 144 of the rack 142, which is engaged by the screws 288 on the follower arms 282, lies in a plane which extends at right angles to the pivot axis of the casing 84, so that the rack 142 will remain at all times under the control of the cam disk 820 despite the oscillatory movement of the casing 84 in the direction of the arrow 90 in Fig. 7.

The push bar 130 (Fig. 10) is, for the opening and closing of the jaws 102 and 104 of the gripper B, reciprocated in each link-forming cycle of the machine by any suitable means (not shown) including another cam disk or disks on the main shaft 210.

The normally spring-separated tool holders 168 and 170 are in each link-forming cycle of the machine operated by and under the control of rockers 290 and 292, respectively, which are pivotally mounted at 294 and 296 in spaced lateral lugs 298 and 300 on the opposite sides, respectively, of the plate support 160 (Figs. 6, 7 and 8). The lower ends of the rockers 290 and 292 carry followers 302 and 304, respectively, which cooperate with cam disks 306 and 308, respectively, on the main shaft 210 (Fig. 8). The rockers 290 and 292 preferably carry at their upper ends adjustment screws 310 and 312, respectively, with which to engage the adjacent sides of the tool holders 168 and 170, respectively. The previously described springs 202 and 204, which normally urge the tool holders 168 and 170 apart, thus also serve to retain the rockers 290 and 292 in permanent engagement with their respective cams 306 and 308.

In order to provide for separation of the tool holders 168 and 170 to a variable extent, there are provided adjustable stop screws 311 and 313 (Fig. 6) which are received in the depending legs 314 and 316, respectively, of a U-shaped bracket 318, mounted at 320 on a post 322 which projects upwardly from the plate support 160 between the tool holders 168 and 170 (Fig. 8). The stop screws 311 and 313 permit independent adjustment of the tool holders 168 and 170, respectively, in their respective spread positions. The machine described so far is conventional in all essential respects, and the inventive aspect thereof will now be described.

*Chain handling provisions E*

As previously mentioned, it is for the efficient production of a multi-link chain imperative that each leading turn $t'$ of the wire helix $h$ passes unfailingly through the two last-formed links $l'$ and $l''$ of the chain being made. To accomplish this end, the two last-formed links of the chain are held in such relative disposition with respect to each other, that the gap $g$ between them (Fig. 1) is of maximum dimension and in the path of movement of the end of the leading turn $t'$ of the wire helix into the foremost position shown in Fig. 12. At the time in each link-forming cycle of the machine at which the wire helix $h$ is advanced for the concatenation of its leading turn $t'$ with the two last-formed links of the chain, the link $l'$ is firmly held by the jaws 102 and 104 of the gripper B in the fashion shown in Figs. 1 and 11, wherefore it is imperative that the adjacent link $l''$ is held in a certain disposition relative to the gripped link $l'$ in order that the leading turn $t'$ will without fail pass through the gap $g$ between both links $l'$ and $l''$. In order to accomplish this without fail, yet in a structurally simple manner, a leading length $c'$ of the chain, whereof the links are in their formation into the chain turned, clockwise as viewed in Figs. 1 and 2, over the preceding links thereof in the orderly relative disposition there shown, is held in the longitudinal disposition shown in Fig. 1. While in this longitudinal disposition, and on mere longitudinal tensioning of the chain length $c'$, the links of the latter will resist twisting of any individual link thereof from its orderly arrangement with the rest of the links, with the result that the link $l''$ is most securely held in correct position relative to the gripped link $l'$ for the penetration of both links $l'$ and $l''$ by the leading turn $t'$ of the advancing wire helix $h$. By leading the chain length $c'$ longitudinally sideways from the gripped link $l'$ as shown in Figs. 1 and 11, the gap $g$ between the links $l'$ and $l''$ is brought into correct alignment with the leading turn $t'$ of the wire helix for unfailing penetration by the latter, and the chain length $c'$ furthermore clears the closely proximate tools 28, 30, 32 and 180 in the holders 168 and 170. The chain length $c'$ is longitudinally tensioned by the weight of the remaining chain already formed which is permitted to drop through a considerable distance into any suitable container (not shown) in which the chain is collected. After the passage of the leading turn $t'$ of the wire helix $h$ through the gap $g$ between the end links $l'$ and $l''$, the chain length $c'$ is shifted into the longitudinal disposition shown in Figs. 3 to 5, inclusive, in which the links $l'$ and $l''$ are, after the release of the link $l'$ from the gripper B and while both links $l'$ and $l''$ are solely held in suspended fashion on the leading helix turn $t'$, sufficiently retracted from the adjacent tools 28, 30 and 32 to permit the latter to form the then gripped helix turn $t'$ into the next link $l$ of the chain in the manner previously described. For the different longitudinal dispositions of the chain length $c'$ at the proper time periods in each link-forming cycle of the machine, recourse is had to a chain guide 330 which is in the form of an eye having an elongated slot 332 through which the chain passes widthwise. The slot 332 is so dimensioned that the links of the chain passing therethrough may not be turned over to disturb the orderly and advantageously arranged links of the chain length $c'$ (Figs. 1 to 5).

The chain guide 330 is provided with a base 334 which forms a link of a chain 336, the other links of which are conventional as shown in Figs. 1 and 7, for instance. One end of the chain 336 is suitably anchored at 338 on an arcuate end plate 340 of an arm 342 (Fig. 7) which is freely rotatable with its hub 344 on the shaft 234 (Fig. 6). The other end of the chain 336 is connected at 346 with a suitably anchored tension spring 348 which normally tends to draw the chain 336 in the direction of the arrow 350 in Fig. 7. The chain 336 passes over a reel 352 which is rotatably mounted at 354 on a pedestal 356 on the machine table 42 (Figs. 6 and 7).

Figure 4:
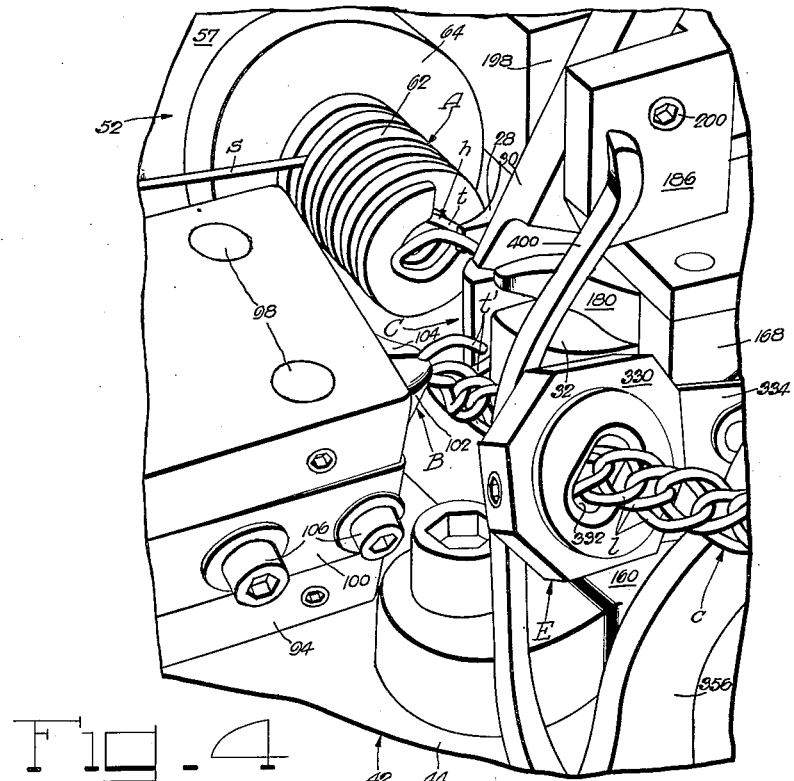
Figure 5:
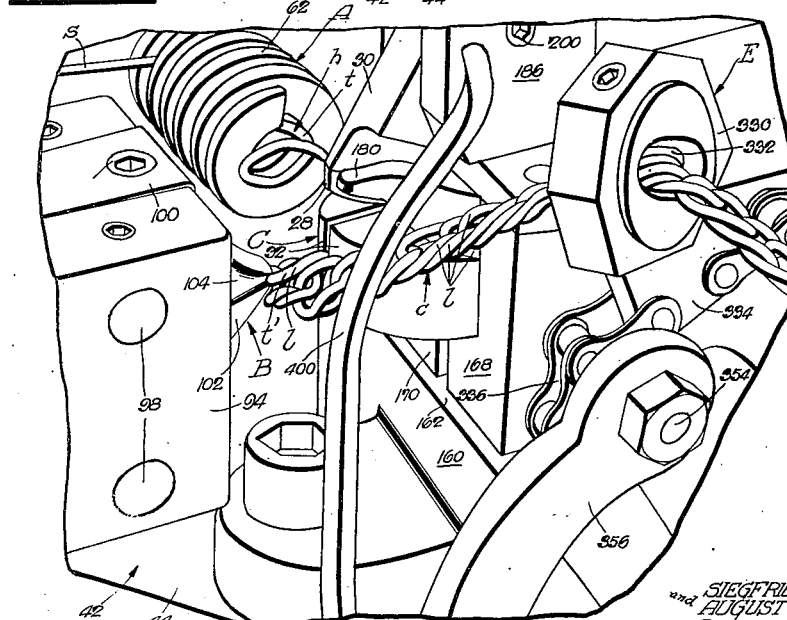

As already mentioned, the chain guide 330 is normally urged into the lower position shown in Figs. 2 to 4, inclusive, by the spring 348 which acts on the chain 336. The chain guide 330 is admitted into its lower position shortly after the start of each link-forming cycle of the machine (Fig. 2), and is retracted to its upper position shortly before the termination of each link-forming cycle (Fig. 5). To this end, disks 360 and 362 are mounted in any suitable manner on the shaft 234 and on opposite sides, respectively, of the hub 344 of the arm 342 (Fig. 6). Thus, the disks 360 and 362, being mounted on the shaft 234, oscillate with the gear segment 232 which actuates the winding arbor 60 of the machine, while the arm 342 is with its hub 344 freely rotatable on the shaft 234, as previously explained. The disk 362 carries a laterally projecting pin 364 (Fig. 6A) which projects into a peripheral groove 366 in the hub 344 of the arm 342. The other disk 360 carries a laterally projecting pin 368 (Fig. 6A) which is adapted to release a latch member 370 from interlocking engagement with the hub 344 of the arm 342. The latch member 370 is pivoted at 372 on a bracket 374 (Fig. 7) which is suitably mounted at 376 on the machine table 42. The latch member 370, which is normally urged into engagement with the hub 344 of the arm 342 by means of a suitably mounted torsion spring 378, is provided at its free end with a shoulder 380 that is adapted to interlock with a peripheral shoulder 382 in the hub 344 of the arm 342 (Fig. 6A) when the latter is in its retracted position (Fig. 7) in which the chain guide 330 is in the corresponding upper position. The gear segment 232 is, at the start of each link-forming cycle of the machine, turned counter-clockwise from the position shown in Fig. 7 in order to impart to the arbor 60 its single revolution in wire-winding direction. During the initial part of such rotation of the gear segment 232, the pin 364 on the disk 362 advances from the position shown in Fig. 6A into that shown in Fig. 6B before the pin 368 on the other disk 360 moves into cooperative relation with the latch member 370. Hence, the arm 342 remains during this initial part of the described rotary motion of the gear segment 232 locked in its most retracted position by the latch member 370. On continued rotary motion of the gear segment 232 in arbor-driving direction, the latch member 370 is retracted from interlocking engagement with the hub 344 of the arm 342 by the action of the pin 368 on the disk 360 (Fig. 6C), thereby releasing the chain 336 for movement by the spring 348 into the position shown in Fig. 2 in which the chain guide 330 is carried to its lower position. The released arm 342 will, on arrival of the chain guide 330 in its lower position, engage an adjustable stop screw 390 in a bracket 392 (Figs. 6 and 7). At the time in each link-forming cycle of the machine at which the arm 342 is released from the latch member 370 for the quick shift of the chain guide 330 from its upper to its lower position, as described, the leading turn $t'$ of the wire helix $h$ has safely entered the gap $g$ between the links $l'$ and $l''$ of the chain (Fig. 2), but has not yet fully advanced to the foremost position shown in Fig. 3. The chain guide 330 is shifted into its lower position at this stage (Fig. 2) in each link-forming cycle of the machine in order to assure the secure anchorage of the links $l'$ and $l''$ in the bottom portion of the leading turn $t'$ of the wire helix $h$ (Fig. 3) after the link $l'$ is released from the jaws 102 and 104 of the gripper B prior to or substantially at the time the leading helix turn $t'$ reaches its foremost position shown in Figs. 3 and 12. Were it not for the shift of the chain guide 330 into its lower position prior to the release of the link $l'$ from the gripper B, the links $l'$ and $l''$ would more often than not escape from the leading helix turn $t'$ and interrupt the operation of the machine.

At the end of one complete revolution of the arbor 60 in each link-forming cycle of the machine, the parts 344, 362, 364, 368 and 370 assume the relative position shown in Fig. 6D. On the following return rotation of the gear segment 232 into the position shown in Fig. 7, during which the winding arbor 60 is not driven and the tools 28, 30 and 32 perform their designated functions on the leading helix turn $t'$, the pin 368 on the disk 360 will move through a considerable angular distance before engaging the shoulder 394 on the hub 344 of the arm 342 and returning the latter to its retracted position (Figs. 6A and 7) which is reached when the gear segment 232 completes its return rotation. Hence, it is only during the latter portion of each link-forming cycle of the machine, i. e. during the last step of twisting the link being formed (Fig. 5), that the chain guide 330 is returned to its upper position for the correct disposition of the chain length c' for the unfailing reception by the end links l' and l'' of the leading helix turn t' in the next link-forming cycle of the machine.

For added and better control over the longitudinal disposition of the chain length c' in the lower position of the chain guide 330, the chain length c' may in the latter position of the chain guide 330 be somewhat deflected from linear extension by an auxiliary guide 400 which is suitably mounted at 402 on the machine table 42.

While we have shown and described the preferred embodiments of our invention, it will be understood that various changes may be made in the present invention without departing from the underlying idea or principles of the invention within the scope of the appended claims.

Having thus described our invention, what we claim and desire to secure by Letters Patent, is:

1. In a double-link chain machine, the combination of mechanism for forming successive chain links, including means for holding each last link in position for penetration by the next link being formed for the concatenation of successive chain links, and a guide having a slot through which the chain is adapted to be drawn in longitudinally tensioned condition away from said holding means as successive links are added to the chain, said slot being dimensioned so as to permit the passage therethrough of successive chain links in a certain disposition only relative to the tensioned links in the chain length between said holding means and said guide, and the latter being positioned remotely from said holding means for longitudinally disposing the chain length between said holding means and guide so that the third-last chain link previously concatenated with the second-last and last chain links in double-link fashion positions said second-last link for penetration by the next link being formed when the latter penetrates said last link.

2. The combination in a double-link chain machine as set forth in claim 1, in which said chain length is held in longitudinally tensioned condition by the weight of a continuing length of the chain hanging from said guide.

3. A device for adapting for the manufacture of double-link chains a single-link chain machine having mechanism for forming successive chain links, including means for holding each last link in position for penetration by the next link being formed for the concatenation of successive links into single-link chain form, said device comprising a guide having a slot through which the chain is adapted to be drawn in longitudinally tensioned condition away from said holding means as successive links are added to the chain, said slot being dimensioned so as to permit the passage therethrough of successive chain links in a certain disposition only relative to the tensioned links in the chain length between said holding means and said guide, and the latter being positioned remotely from said holding means for longitudinally disposing the chain length between said holding means and guide so that the third-last chain link previously concatenated with the second-last and last chain links in double-link fashion positions said second-last link for penetration by the next link being formed when the latter penetrates said last link.

4. In a double-link chain machine, the combination of mechanism for forming successive chain links, including means for holding each last link in position for penetration by the next partially-formed link for the concatenation of successive chain links, and for holding said next link for its finish-formation after the release into suspended relation therewith of said last link, tool means for finish-forming each partially-formed link, and a guide having a slot through which the chain is adapted to be drawn in longitudinally tensioned condition away from said holding means as successive links are added to the chain, said slot being dimensioned so as to permit the passage therethrough of successive chain links in a certain disposition only relative to the tensioned links in the chain length between said holding means and said guide, and the latter being remote from said holding means and movable into a first position in which said chain length is so longitudinally disposed as to be drawn with its last link in said next link away from said tool means for the finish-formation of the latter link, and into a second position in which said chain length is so longitudinally disposed that the third-last link previously concatenated with the second-last and last links in double-link fashion positions said second last link for penetration by said next link when the latter penetrates said last link.

5. The combination in a double-link chain machine as set forth in claim 4, in which said chain length is held in longitudinally tensioned condition by the weight of a continuing length of the chain hanging from said guide.

6. A device for adapting for the manufacture of double-link chains a single-link chain machine having mechanism for forming successive chain links, including means for holding each last link in position for penetration by the next partially-formed link for the concatenation of successive links into single-link chain form, and for holding said next link for its finish-formation after the release into suspended relation therewith of said last link, and tool means for finish-forming each partially formed link, said device comprising a guide having a slot through which the chain is adapted to be drawn in longitudinally tensioned condition away from said holding means as successive links are added to the chain, said slot being dimensioned so as to permit the passage therethrough of successive chain links in a certain disposition only relative to the tensioned links in the chain length between said holding means and said guide, and the latter being remote from said holding means and movable into a first position in which said chain length is so longitudinally disposed as to be drawn with its last link in said next link away from said tool means for the finish-formation of the latter link, and into a second position in which said chain length is so longitudinally disposed that the third-last link previously concatenated with the second-last and last links in double-link fashion positions said second last link for penetration by said next link when the latter penetrates said last link.

7. A double-link chain machine, comprising a device for intermittently advancing a wire helix in corkscrew fashion, means for holding each last formed link in position for penetration by a leading length of the wire helix on its next intermittent advance for the concatenation of successive chain links, and for releasing said last formed link into suspended relation with said leading helix length and then holding the latter for its formation into a link during the following intermittent stop of said helix, tool means opposite said holding means for forming each leading helix length into a link, and a guide over which the chain is passed in longitudinally tensioned condition, said guide being spaced laterally from said holding and tool means and movable into a first position in which the chain length between said guide and holding means is so longitudinally disposed as to be drawn with its last link in the leading helix length away from said tool means for the link formation of said helix length, said guide being also movable into a second position in which said chain length is so longitudinally disposed that the third-last link previously concatenated with the second-last and last links in double-link fashion positions said second-last link for penetration by said leading helix turn when the latter penetrates said last link.

8. A double-link chain machine as set forth in claim 7, in which said chain length is in said first position of said guide drawn into firm suspended relation with said leading helix length.

9. A double-link chain machine as set forth in claim 7, further comprising means operated in timed relation with said device for moving said guide into said second position at the end of the link formation of each leading helix length, and into said first position after the penetration of each pair of last and second-last links by each leading helix length and before the release of each last link from said holding means, and said chain length is in said first position of said guide drawn into firm suspended relation with said leading helix turn.

10. A double-link chain machine as set forth in claim 7, further comprising mechanism operated in timed relation with said device for operating said holding means, and means also operated in timed relation with said device for moving said guide into said second position at the end of the link formation of each leading helix length, and into said first position after the penetration of each pair of last and second-last links by each leading helix length and before the release of each last link from said holding means, and said chain length is in said first position of said guide drawn into firm suspended relation with said leading helix turn.

11. A double-link chain machine as set forth in claim 8, further comprising a driving chain carrying said guide, a pivoted rocker having one end of said driving chain secured thereto and being turnable to and from an angular position in which said guide is in one of said positions thereof, and spring means connected to the other end of said driving chain for drawing the latter into the other of said positions thereof 12. A double-link chain machine as set forth in claim 7, further comprising means for so moving said guide that the latter is in said first and second positions thereof below and above the level of said holding means, respectively.

13. A double-link chain machine as set forth in claim 7, further comprising a driving chain carrying said guide, a pivoted rocker having one end of said driving chain secured thereto and being turnable to and from an angular position in which said guide is in one of said positions thereof, spring means connected to the other end of said driving chain for drawing the latter into the other of said positions thereof, and a rotatably mounted wheel over which said driving chain passes, said wheel being so positioned that said guide is in said first and second positions thereof on opposite sides of said wheel below and above the level of said holding means, respectively.

14. A double-link chain machine as set forth in claim 7, further comprising a driving chain carrying said guide, a pivoted rocker having one end of said driving chain secured thereto and being turnable to and from an angular position in which said guide is in one of said positions thereof, spring means connected to the other end of said driving chain for drawing the latter into the other of said positions thereof, and a rotatably mounted wheel over which said driving chain passes, said wheel being so positioned that said guide is in said first and second positions thereof on opposite sides of said wheel below and above the level of said holding means, respectively, and said guide provides an aperture through which the chain passes and which is dimensioned to permit the passage of the concatenated chain links in a certain angular disposition only.

15. A double-link chain machine, comprising a device including a pivoted driving member for intermittently advancing a wire helix in corkscrew fashion on turning movement of said member in one direction from a certain angular position, said member having an idle rotary return movement into said certain position, means for holding each last formed link in position for penetration by a leading length of the wire helix on its next intermittent advance for the concatenation of successive chain links, and for releasing said last formed link into suspended relation with said leading helix length and then holding the latter for its formation into a link during the following intermittent stop of said helix, tool means opposite said holding means for forming each leading helix length into a link, a guide over which the chain is passed in longitudinally tensioned condition, said guide being spaced laterally from said holding and tool means and movable into a first position in which the chain length between said guide and holding means is so longitudinally disposed as to be drawn with its last link in the leading helix length away from said tool means for the link formation of said helix length, said guide being also movable into a second position in which said chain length is so longitudinally disposed that the third-last link previously concatenated with the second-last and last links in double-link fashion positions said second-last link for penetration by said leading helix turn when the latter penetrates said last link, and mechanism operated in timed relation with said device for moving said guide into said second position at the end of the link formation of each leading helix turn, and into said first position after the penetration of each pair of last and second-last links by each leading helix turn and before the release of each last link from said holding means.

16. A double-link chain machine as set forth in claim 15, in which said mechanism comprises a pivoted rocker, a driving connection between said rocker and guide for moving the latter into said first and second positions thereof on turning said rocker in opposite directions into first and second positions, respectively, spring means normally urging said rocker into said first position thereof, a yielding latch normally arresting said rocker in said second position thereof, means turning with said driving member for releasing said latch from said guide after partial movement of said driving member in said one direction, and means returning said rocker into said second position thereof on rotary movement of said driving member through a last part of its idle return into said certain position.

17. A double-link chain machine as set forth in claim 15, in which said mechanism comprises a pivoted rocker, a driving connection between said rocker and guide for moving the latter into said first and second positions thereof on turning said rocker in opposite directions into first and second positions, respectively, spring means normally urging said rocker into said first position thereof, a yielding latch normally arresting said rocker in said second position thereof, means turning with said driving member for releasing said latch from said guide after partial movement of said driving member in said one direction, and means also turning with said driving member for returning said rocker into said second position thereof during a last part of the idle return movement of said driving member into said certain position.

18. Method of producing double-link chains in a single-link chain machine having mechanism for forming successive chain links, including means for holding each last link in position for penetration by the next link being formed for the concatenation of successive links into single-link chain form and a guide over which the chain is passed in longitudinally tensioned condition, said guide being spaced laterally from said holding means, comprising the steps of holding the first-formed link of a chain in position for penetration by the next link being formed when the latter penetrates the second-formed link in the normal operation of the machine, and thereafter moving said guide into a position for drawing the chain away from said holding means in a generally longitudinal direction so that each third-last chain link positions each second-last chain link for penetration by each next link being formed when the latter penetrates said last chain link.

19. Method of producing double-link chains in a single-link chain machine having mechanism for forming successive chain links, including means for holding each last link in position for penetration by the next partially formed link for the concatenation of successive links into single-link chain form, and for holding said next link for its finish formation after the release into suspended relation therewith of said last link, tool means for finish-forming each partially formed link, and a guide over which the chain is passed in longitudinally tensioned condition, said guide being spaced laterally from said holding means, comprising the steps of holding the first-formed link of a chain in position for penetration by the next link being formed when the latter penetrates the second-formed link in the normal operation of the machine, and thereafter moving said guide into a first position for drawing the chain length disposed between said guide and holding means away from said holding means in a longitudinal direction so the chain is drawn away from said tool means with each last link positioned in each partially formed link for the finish-formation of the latter link, and moving the guide into another position for drawing the chain length disposed between said guide and holding means away from the holding means in which each third-last link positions each second-last link for penetration by each partially formed link when the latter penetrates said last link in the normal operation of the machine.

SIEGFRIED C. KUNZMANN.
AUGUST J. ENGLAND.

REFERENCES CITED

The following references are of record in the file of this patent:

UNITED STATES PATENTS

| Number | Name | Date |
|---|---|---|
| 528,819 | Standish | Nov. 6, 1894 |
| 543,944 | Peck et al. | Aug. 6, 1895 |
| 2,065,788 | Biedermann | Dec. 29, 1936 |
| 2,300,624 | Keene | Nov. 3, 1942 |